(12) United States Patent
Wu et al.

(10) Patent No.: US 11,939,677 B2
(45) Date of Patent: Mar. 26, 2024

(54) COATED METAL ALLOY SUBSTRATE WITH AT LEAST ONE CHAMFERED EDGE AND PROCESS FOR PRODUCTION THEREOF

(71) Applicant: Hewlett-Packard Development Company, L.P., Spring, TX (US)

(72) Inventors: Kuan-Ting Wu, Taipei (TW); Chi Hao Chang, Taipei (TW); Hsing-Hung Hsieh, Taipei (TW)

(73) Assignee: Hewlett-Packard Development Company, L.P., Spring, TX (US)

(*) Notice: Subject to any disclaimer, the term of this patent is extended or adjusted under 35 U.S.C. 154(b) by 310 days.

(21) Appl. No.: 17/297,210

(22) PCT Filed: Jun. 11, 2019

(86) PCT No.: PCT/US2019/036485
§ 371 (c)(1),
(2) Date: May 26, 2021

(87) PCT Pub. No.: WO2020/251548
PCT Pub. Date: Dec. 17, 2020

(65) Prior Publication Data
US 2022/0112607 A1    Apr. 14, 2022

(51) Int. Cl.
*C23C 22/57* (2006.01)
*C09D 5/44* (2006.01)
(Continued)

(52) U.S. Cl.
CPC ............ *C23C 22/57* (2013.01); *C09D 5/4411* (2013.01); *C09D 5/4419* (2013.01); *C23C 22/78* (2013.01); *C25D 13/12* (2013.01)

(58) Field of Classification Search
None
See application file for complete search history.

(56) References Cited

U.S. PATENT DOCUMENTS

| 10,288,871 B1 * | 5/2019 | Kumar ................ H01L 27/1218 |
| 2010/0285275 A1 | 11/2010 | Baca et al. |
| 2018/0257978 A1 * | 9/2018 | Minamidate ............ B32B 27/14 |

FOREIGN PATENT DOCUMENTS

| CN | 108286035 A | 7/2018 |
| KR | 101398431 B1 | 5/2014 |

OTHER PUBLICATIONS

Zhang, et al., "Corrosion Resistance and Mechanism of Micro-Nano Structure Super-Hydrophobic Surface Prepared by Laser Etching Combined with Coating Process", emeraldinsight, Anti-Corrosion Methods and Materials, Earlycite, Jan. 2019, 3 pgs.

(Continued)

*Primary Examiner* — John Vincent Lawler
(74) *Attorney, Agent, or Firm* — HP Inc. Patent Department

(57) ABSTRACT

A coated metal alloy substrate with at least one chamfered edge, a process for producing a coating a metal alloy substrate, and an electronic device having a housing comprising a coated metal alloy substrate are described. The coated metal alloy substrate with at least one chamfered edge comprises a hydrophobic anti-fingerprint layer deposited on the metal alloy substrate, a passivation layer deposited on the at least one chamfered edge, and a water based paint layer deposited on the passivation layer.

15 Claims, 3 Drawing Sheets

(51) Int. Cl.
    *C23C 22/78*      (2006.01)
    *C25D 13/12*      (2006.01)

(56) References Cited

OTHER PUBLICATIONS

Ishizaki, et al., "High Functionalization of Magnesium Alloy Surface by Superhydrophobic Treatment", Magnesium Alloys—Corrosion and Surface Treatments, Jan. 2011, 29 pgs.

* cited by examiner

COATED METAL ALLOY SUBSTRATE WITH AT LEAST ONE CHAMFERED EDGE AND PROCESS FOR PRODUCTION THEREOF

Electronic devices, such as laptops and mobile phones, include various components located within a metal alloy housing. Such metal alloy housings are made of metal alloy substrates that provide a sought after metallic lustre of the metal alloy housing. Such housings should be able to withstand wear and tear from regular use and exposure to the natural environment.

Figure 1:
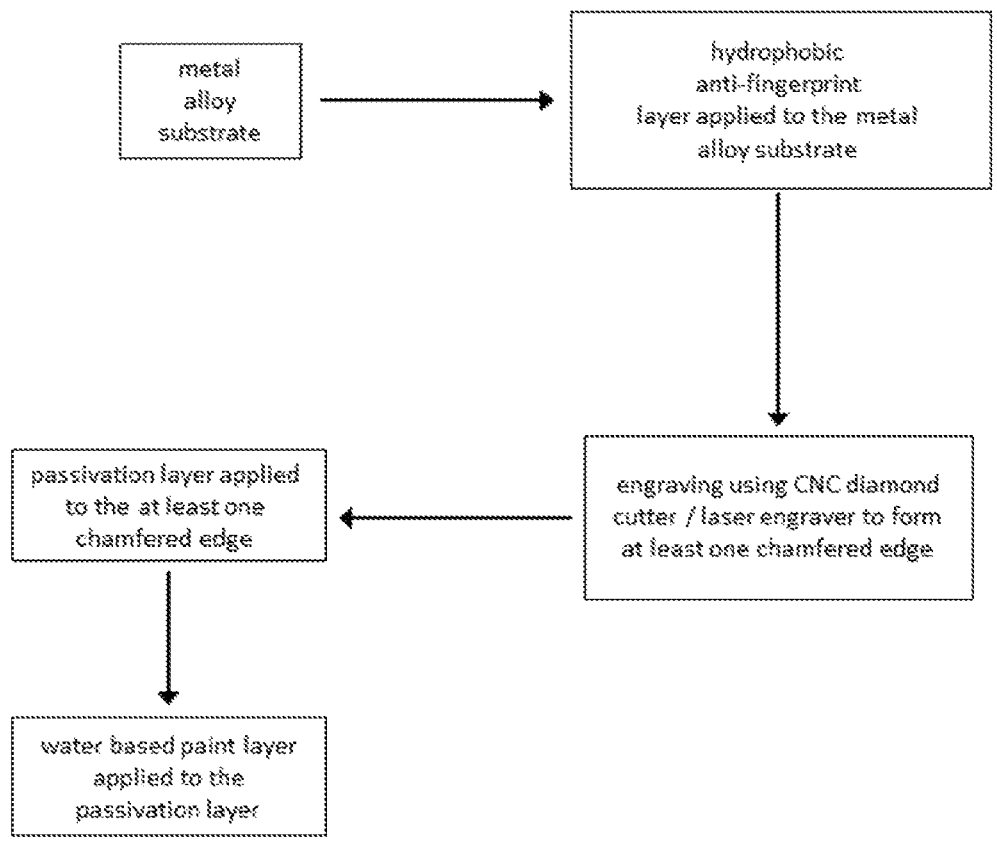
FIG. 1 is a flow chart showing an example of a process for producing a coated metal alloy substrate.

The figures depict several examples of the present disclosure. It should be understood that the present disclosure is not limited to the examples depicted in the figures.

DETAILED DESCRIPTION

Before the coated metal alloy substrate, process for producing a coated metal alloy substrate, and electronic device with a housing comprising a coated metal alloy substrate and related aspects are disclosed and described, it is to be understood that this disclosure is not limited to the particular process steps and materials disclosed herein because such process steps and materials may vary somewhat. It is also to be understood that the terminology used herein is used for the purpose of describing particular examples only. The terms are not intended to be limiting because the scope of the present disclosure is intended to be limited only by the appended claims and equivalents thereof.

It is noted that, as used in this specification and the appended claims, the singular forms "a", "an" and "the" include plural referents unless the context clearly dictates otherwise.

If a standard test is mentioned herein, unless otherwise stated, the version of the test to be referred to is the most recent at the time of filing this patent application.

As used herein, the term "about" is used to provide flexibility to a numerical range endpoint by providing that a given value may be "a little above" or "a little below" the endpoint. The degree of flexibility of this term can be dictated by the particular variable and would be within the knowledge of those skilled in the art to determine based on experience and the associated description herein.

Concentrations, amounts, and other numerical data may be expressed or presented herein in a range format. It is to be understood that such a range format is used merely for convenience and brevity and thus should be interpreted flexibly to include not only the numerical values explicitly recited as the limits of the range, but also to include all the individual numerical values or sub-ranges encompassed within that range as if each numerical value and sub-range is explicitly recited. As an illustration, a numerical range of "about 1 wt. % to about 5 wt. %" should be interpreted to include not only the explicitly recited values of about 1 wt. % to about 5 wt. %, but also include individual values and subranges within the indicated range. Thus, included in this numerical range are individual values such as 2, 3.5, and 4 and sub-ranges such as from 1-3, from 2-4, and from 3-5, etc. This same principle applies to ranges reciting only one numerical value. Furthermore, such an interpretation should apply regardless of the breadth of the range or the characteristics being described.

As used herein, a plurality of items, structural elements, compositional elements, and/or materials may be presented in a common list for convenience. However, these lists should be construed as though each member of the list is individually identified as a separate and unique member. Thus, no individual member of such list should be construed as a de facto equivalent of any other member of the same list solely based on their presentation in a common group without indications to the contrary.

As used herein, the term "deposited" when used to refer to the location or position of a layer includes the term "disposed" or "coated".

As used herein, the term "engraving" when used to refer to the formation of a chamfered edge includes the term "etching" or "cutting".

As used herein, the term "comprises" has an open meaning, which allows other, unspecified features to be present. This term embraces, but is not limited to, the semi-closed term "consisting essentially of" and the closed term "consisting of". Unless the context indicates otherwise, the term "comprises" may be replaced with either "consisting essentially of" or "consists of".

Unless otherwise stated, any feature described herein can be combined with any aspect or any other feature described herein.

In an aspect, there is provided a coated metal alloy substrate for an electronic device, wherein the coated metal alloy substrate comprises at least one chamfered edge and comprises:
  a hydrophobic anti-fingerprint layer deposited on the metal alloy substrate;
  a passivation layer deposited on the at least one chamfered edge; and
  a water based paint layer deposited on the passivation layer.

In another aspect, there is provided a process for producing a coated metal alloy substrate for an electronic device comprising:
  applying a hydrophobic anti-fingerprint layer to the metal alloy substrate;
  engraving the metal alloy substrate to form at least one chamfered edge;
  applying a passivation layer to the at least one chamfered edge; and
  applying a water based paint layer to the passivation layer.

In a further aspect, there is provided an electronic device having a housing, wherein the housing comprises:
  a metal alloy substrate with at least one chamfered edge;
  a hydrophobic anti-fingerprint layer deposited on the metal alloy substrate;
  a passivation layer deposited on the at least one chamfered edge; and
  a water based paint layer deposited on the passivation layer.

Metal Alloy Substrate

The metal alloy substrate may comprise a metal selected from aluminium, magnesium, lithium, titanium, niobium, zinc and alloys thereof. These metals may be light-weight and can provide a durable housing.

Generally, the metal alloy comprises a content of metal of at least about 75 wt. %, based on the total weight of the metal alloy. For example, the metal alloy may comprise at least about 80 wt % metal, or at least about 85 wt % metal, or at least about 90 wt. % metal, based on the total weight of the metal alloy.

The metal alloy may further comprise aluminium, zinc, manganese, silicon, iron, calcium, nickel, copper, lithium, zirconium, or combinations thereof. The aluminium content may be about 2.5 wt % to about 13.0 wt. %, based on the total weight of the metal alloy. When the metal alloy comprises aluminium, then at least one of manganese, zirconium, or silicon is also present. In one example, the metal alloy may be a magnesium alloy. Examples of magnesium alloys include AZ31, AZ31B, AZ61, AZ60, AZ80, AM60, AZ91, AZ91D, LZ91, LZ14, ALZ alloys according to the American Society for Testing Materials standards.

In one example, the metal alloy comprises the components, based on the total weight of the metal alloy, Al: 0.02 wt. % to 9.7 wt. %, Zn: 0.02 wt % to 1.4 wt. %, Mn: 0.02 wt. % to 0.5 wt. %, one or more component selected from Si: 0.02 wt. % to 0.1 wt. %, Fe: 0.004 wt. % to 0.05 wt. %, Ca: 0.0013 wt. % to 0.04 wt. %, Ni: 0.001 wt. % to 0.005 wt. %, Cu: 0.008 wt. % to 0.05 wt. %, Li: 9.0 wt. % to 14.3 wt. %, Zr: up to 0.002 wt. % and the balance being Mg and inevitable impurities.

Insert Moulded Metal Substrate

The metal alloy substrate may be an insert moulded metal substrate to form a metal substrate with sections comprising a further material, such as plastics. For example, the insert moulded metal substrate may be formed by using the metal substrate as a mould. This metal mould may have a section into which a material, such as plastic, is injected to form a plastic insert. Plastics used for insert moulded metal substrates may be selected from polybutylene terephthalate (PBT), polyphenylene sulfide (PPS), polyamide (nylon), polyphthalamide (PPA), acrylonitrile butadiene styrene (ABS), polyetheretherketone (PEEK), polycarbonate (PC) and acrylonitrile butadiene styrene with polycarbonate (ABS/PC) with 15 to 50 wt % glass fibre filler.

Chamfered Edge

The metal alloy substrate comprises at least one chamfered edge. The chamfered edge is formed by engraving the metal alloy substrate. The engraving process to form a chamfered edge can be carried out using a range of techniques including a computer numeric control (CNC) diamond cut or laser engraving process. The engraving process exposes a non-oxidized surface of the substrate. The non-oxidized surface of the substrate exposed in this way is an uncoated surface of the substrate that has not undergone substantial oxidation, so that, for example, it retains its metallic appearance.

By coating the non-oxidised surface of the metal alloy substrate formed by engraving with a passivation layer and a water based paint layer, it is possible to both protect and retain the attractive, shiny appearance of the underlying metallic substrate. Unlike coatings formed by electroplating processes, the layer can protect the exposed, underlying surface from corrosion. The coated chamfered edges disclosed herein can show good resistance as tested using a salt fog test, such as ASTM B117, particularly when compared to coating formed by electroplating.

Hydrophobic Anti-Fingerprint Layer

The metal alloy substrate is coated with a hydrophobic anti-fingerprint layer. The hydrophobic anti-fingerprint layer may be transparent. The hydrophobic anti-fingerprint layer may comprise a fluoropolymer. The fluoropolymer may be selected from fluorinated olefin-based polymers, fluoroacrylates, fluorosilicone acrylates, fluorourethanes, perfluoropolyethers, perfluoropolyoxetanes, C1 to C6 fluorotelomers, polytetrafluoroethylene, polyvinylidenefluoride and fluorosiloxane. In one example example the fluoropolymer is polyvinylidenefluoride.

The fluoropolymer comprised in the hydrophobic anti-fingerprint layer may be a UV polymer, which may be cured at 80 to 120° C. The fluoropolymer comprised in the hydrophobic anti-fingerprint layer may be a hydrophobic polymer, comprising 7-carbons or more.

The hydrophobic anti-fingerprint layer comprises at least 20 wt. % of a fluoropolymer, based on the total weight of the hydrophobic anti-fingerprint layer. For example, the hydrophobic anti-fingerprint layer may comprise at least 25 wt. % of fluoropolymer, or at least 30 wt. % of fluoropolymer, or at least 40 wt-% of fluoropolymer, or at least 50 wt-% of fluoropolymer, or at least 60 wt-% of fluoropolymer, or at least 70 wt-% of fluoropolymer, based on the total weight of the hydrophobic anti-fingerprint layer.

In addition to the fluoropolymer, the hydrophobic anti-fingerprint layer may further comprise components selected from isophorone, cyclohexanone, acrylic resin and combinations thereof. In one example, the hydrophobic anti-fingerprint layer comprises 20 wt. % polyvinylidenefluoride, 40 wt. % isophorone, 5 wt. % cyclohexanone and 35 wt. % acrylic resin, based on the total weight of the hydrophobic anti-fingerprint layer.

The hydrophobic anti-fingerprint layer may have a high contact angle. In one example, the hydrophobic anti-fingerprint layer may have a contact angle of about 100° or more, such about 105° or more, or about 110° or more. The contact angle is the angle, conventionally measured through the liquid, where a liquid-vapour interface meets a solid surface. It quantifies the wettability of a solid surface by a liquid via the Young equation. A given system of solid, liquid, and vapour at a given temperature and pressure has a unique equilibrium contact angle. However, in practice a dynamic phenomenon of contact angle hysteresis is often observed, ranging from the advancing (maximal) contact angle to the receding (minimal) contact angle. The equilibrium contact is within those values, and can be calculated from them. The equilibrium contact angle reflects the relative strength of the liquid, solid, and vapor molecular interaction. The contact angle may be measured using a Drop Shape Analyzer, such as DSA100.

The hydrophobic anti-fingerprint layer may have an anti-smudge function and provide a smooth touch feeling. In one example, the hydrophobic anti-fingerprint layer may be on a painted layer and may cause the water based paint not to adhere to the painted layer.

The hydrophobic anti-fingerprint layer may have a thickness of about from 10 nm to about 1 μm, such as from about 50 nm to about 900 nm, or from about 100 nm to about 800 nm, or from about 200 nm to about 700 nm, or from about 300 nm to about 600 nm, or from about 400 nm to about 700 nm.

In one example, the hydrophobic anti-fingerprint layer may be applied to the whole surface of the metal alloy substrate prior to form a chamfered edge.

Passivation Layer

The passivation layer may be transparent. The passivation layer may comprise a chelating agent and a metal ion or chelated metal complex thereof, or a mixture of the chelating agent, the metal ion and the chelated metal complex. The chelated metal complex comprises a ligand coordinated to the metal ion. The ligand is the chelating agent.

The chelating agent may be selected from ethylenediaminetetraacetic acid (EDTA), ethylenediamine (EN), nitrilotriacetic acid (NTA), diethylenetriaminepenta(methylenephosphonic acid) (DTPPH), nitrilotris(methylenephosphonic acid) (NTMP), 1-hydroxyethane-1,1-diphosphonic acid (HEAP) and phosphoric acid. In one example, the chelating agent is DTPPH. In one example, the chelating agent is EDTA.

The metal ion is selected from an aluminium ion, a nickel ion, a chromium ion, a tin ion, an indium ion, and a zinc ion. In one example, the metal ion is selected from an aluminium ion, a nickel ion and a zinc ion.

In one example, the chelated metal complex may comprise DTPPH chelated to an aluminium ion. In another example, the chelated metal complex may comprise DTPPH chelated to a nickel ion. In a further example, the chelated metal complex may comprise DTPPH chelated to a zinc ion.

The passivation layer may have a thickness of from about 30 nm to about 3 µm, such as from about 200 nm to about 2 µm, or from about 500 nm to about 1 µm.

The passivation layer is deposited on the chamfered edge or edges. In one example, the passivation layer may also be deposited on the hydrophobic anti-fingerprint layer of the metal alloy substrate.

Water Based Paint Layer

The water based paint layer is deposited on the passivation layer. The water based paint layer comprises a water based paint comprising a resin selected from acrylic, epoxy resin, polyurethane, polyester, epoxy acrylate, and polyurethane acrylate. The water based paint layer may comprise an acrylic resin, de-ionized water, a defoamer, a surfactant and a rheology modifier. For example the water based paint layer may comprise 50 wt. % to 70 wt. % acrylic resin, 25 wt. % to 45 wt. % de-ionized water, 0.4 wt. % to 1.0 wt. % defoamer, 0.4 wt. % to 1.0 wt. %, surfactant, 0.5 to 2.5 wt. % rheological example, based on the total weight of the water based paint layer. In one example the water based paint layer comprises 60 wt. % acrylic resin, 37 wt. % de-ionized water, 0.7 wt. % alkyl phosphate silicone (defoamer), 0.8 wt % Skytech C055 (surfactant), 1.5 wt. % Acrysol™ RM-725 (rheology modifier), based on the total weight of the water based paint layer.

The use of a water based paint is more environmentally friendly than the use of solvent based paints. The hydrophilic characteristic of water based paint may exhibit enhanced coating adhesion at the chamfered edges. In one example, the water based paint layer does not adhere to hydrophilic anti-fingerprint layer.

The water based paint layer may be transparent. In one example, the water based paint layer is colourless. In another example, the water based paint layer may be coloured.

The water based paint layer may comprise a pigment. Pigment particle may be dispersed throughout the water based paint layer.

The pigment may be selected from carbon black, titanium dioxide, clay, mica, talc, barium sulfate, calcium carbonate, synthetic pigment, pearl pigment, metallic powder, aluminium oxide, dye, graphite, and an inorganic powder. In one example, the pigment is a dye. The dye may be dispersed throughout the water based paint layer.

The water based paint layer may have a thickness of from about 5 µm to from about 20 µm, such as from about 5 µm to from about 20 µm, or from about 7 µm to from about 17 µm, or from about 10 µm to from about 15 µm.

The water based paint layer may be sprayed onto the passivation layer on the chamfered edge. The water based paint layer may be deposited on the entire surface of the metal alloy substrate comprising a passivation layer.

Pre-Treatment of the Metal Alloy Substrate

First Layered Surface

Figure 2:
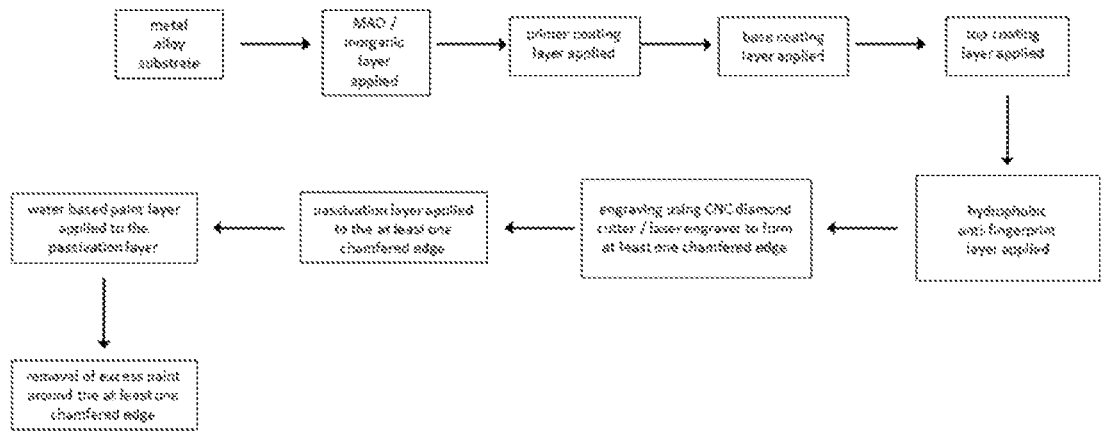
FIG. 2 is a flow chart showing an example of a process for producing a coated metal alloy substrate comprising the formation of a first layered surface.

The metal alloy substrate may be pre-treated to form a first layered surface before the application of the hydrophobic anti-fingerprint layer, as shown, for example in FIG. 2. The first layered surface may comprise a single layer or a combination of layers. The first layered surface may comprise an oxidized layer or a protective layer.

When the first layered surface comprises an oxidized layer, this layer may comprise a preliminary passivation layer, an oxidized layer of the metallic substrate, or both an oxidized layer of the metallic substrate and a preliminary passivation layer. The preliminary passivation layer may also be referred to herein as an inorganic layer.

The inorganic layer may comprise a salt selected from a molybdate salt, a vanadate salt, a phosphate salt, a chromate salt, a stannate salt and a manganese salt. In one example, the inorganic layer comprises a phosphate salt. The inorganic layer may contain oxidic salts that can provide the first surface with a dark grey appearance. In one example, the inorganic layer may be non-transparent.

The oxidized layer of the metallic substrate may be a micro-arc oxide (MAO) layer, such as a micro-arc oxide layer of the magnesium alloy. For example, when the substrate comprises a magnesium alloy, the oxidized layer of the metallic substrate is an oxidized layer of the magnesium alloy. The micro-arc oxide layer may be obtainable from the method described herein.

The oxidized layer of the metallic substrate, including the micro-arc oxide layer, can have a thickness of from about 3 µm to about 15 µm, such as from about 5 µm to about 12 µm, from about 7 µm to about 10 µm. The inorganic layer may have a thickness of from about 0.5 µm to about 5 µm, such as from about 1 µm to about 4 µm, or about 2 µm to about 3 µm.

In one example, both an oxidized layer of the metallic substrate and an inorganic layer may be present. In one example, the inorganic layer can be deposited or coated on the surface of the metal alloy substrate.

In one example, the oxidized layer or the inorganic layer can be a single layer, wherein the oxidized layer is a micro-arc oxide layer. By itself, the micro-am oxide layer or the passivation layer may prevent corrosion of the metal alloy substrate.

The first layered surface may further comprise at least one protective layer, such as two, three or four protective layers. Each protective layer may be selected from a primer coating layer, a base coating layer, powder coating layer and a top coating layer. The protective layer may be deposited or coated directly on to the oxidized layer or the inorganic layer. Each of these protective layers may be made of different materials and may provide different functionality, such as heat resistance, hydrophobicity, and anti-bacterial properties.

The primer coating layer may comprise a polyurethane or a filler selected from carbon black, titanium dioxide, clay, mica, talc, barium sulfate, calcium carbonate, a synthetic pigment, a metallic powder, aluminium oxide, carbon nanotubes (CNTs), graphene, graphite, and an organic powder. The organic powder may, for example, be an acrylic, a polyurethane, a polyamide, a polyester or an epoxide. The primer coating layer may, for example, comprise a polyurethane and a filler as described above.

A heat resistant material may be included in the primer coating layer. In an example, the primer coating layer contains a heat resistant material, a filler as described above and may further comprise a polyurethane.

The primer coating layer can have a thickness of from about 5 µm to about 20 µm, such as from about 7 µm to about 18 µm, or from about 10 µm to about 15 µm.

The base coating layer may comprise polyurethane-containing pigments. The base coating layer may further comprise at least one of carbon black, titanium dioxide, clay, mica, talc, barium sulfate, calcium carbonate, synthetic pigment, metallic powder, aluminium oxide, an organic powder, an inorganic powder, graphene, graphite, plastic beads, a colour pigment or a dye. The organic powder may, for example, be an acrylic, a polyurethane, a polyamide, a polyester or an epoxide.

The base coating layer may comprise a component selected from barium sulfate, talc, a dye and a colour pigment. In one example, the base coating layer comprises a colour pigment or a dye.

The base coating layer may further comprise a heat resistant material, such as a silica aerogel. The base coating layer can comprise a heat resistant material and a component as described above.

The base coating layer can have a thickness of from about 10 µm to about 25 µm, such as from about 15 µm to about 20 µm.

By using a base coating layer, other different protective layers can easily be deposited on the first layered surface. For example, when the first layered surface has been coated with an oxide layer, the use of a base coating layer may improve adhesion between different protective layers.

The powder coating layer may comprise a polymer selected from an epoxy resin, a poly(vinyl chloride), a polyamide, a polyester, a polyurethane, an acrylic and a polyphenylene ether.

In an example, the powder coating layer is an electrostatic powder coating layer. The powder coating layer may be electrostatically deposited or coated onto a first surface of the substrate and then the polymer may be cured.

The powder coating layer may further comprise a filler selected from carbon black, titanium dioxide, clay, mica, talc, barium sulfate, calcium carbonate, a synthetic pigment, a metallic powder, aluminium oxide, carbon nanotubes (CNTs), graphene, graphite, and an organic powder. The organic powder may, for example, be an acrylic, a polyurethane, a polyamide, a polyester or an epoxide. In one example, the fillers may be selected from talc, clay, graphene and high aspect ratio pigments.

The powder coating layer may be applied and may be cured at a temperature of 120° C. to 190° C.

The powder coating layer can have a thickness of from about 20 µm to about 60 µm, such as from about 30 µm to about 50 µm, or from about 35 µm to about 45 µm.

The top coating layer may comprise a bottom layer and a top layer coated or deposited on the bottom layer. The bottom layer may comprise a polyurethane polymer. The top layer may comprise a UV top coat. The UV top coat may, for example, be a resin, such as a polyacrylic resin, a polyurethane resin, a urethane acrylate resin, an acrylic acrylate resin or an epoxy acrylate resin.

When the top coating layer comprises a bottom layer and a top layer, then both the bottom layer and the top layer may be transparent. The top coating layer may be transparent.

The top coating layer can have a total thickness of from about 10 µm to about 25 µm, such as about 15 µm to about 20 µm.

The first layered surface may comprise multiple layers on the metal alloy substrate. The hydrophobic anti-fingerprint layer may then be deposited onto the first layered surface. As disclosed herein, the metal alloy substrate is engraved to expose a non-oxidized chamfered edge on the metal alloy substrate. This process may remove part of the first layered surface that was previously applied. This process may also remove part of the hydrophobic anti-fingerprint layer that was previously applied.

First Treated Surface

The metal alloy substrate may be pre-treated with one or more cleaning step followed by electrophoretic deposition, to form a first treated surface, before the application of the hydrophobic anti-fingerprint layer. The first treated surface may be treated with one or more of the cleaning steps selected from degreasing, chemical polishing and deionized water cleaning. The cleaning steps may even out the surface of the metal alloy substrate.

In one example degreasing is carried out in an ultrasonic vibration bath: comprising an alkaline cleaning process using 0.3-2.0 wt % sodium caseinate, sodium polyacrylate, sodium polyoxyethylene alkyl ether carboxylate, and sodium dodecyl sulfate in an ultrasonic vibration degreasing bath at pH 9-13 to remove organic impurities, grease and oil from a surface.

In one example, chemical polishing is carried out using 0.1-3 wt. % acid solution selected from hydrochloric acid, nitric acid, phosphoric acid, sulfuric acid and combinations thereof.

An electrophoretic polymer is then applied to the cleaned metal alloy substrate surface. The electrophoretic polymer layer is formed by an electrophoretic deposition (EPD) process described herein.

The electrophoretic polymer may be selected from polyacrylic polymer, polyacrylamide-acrylic copolymer and epoxy-containing polymer.

Process for Producing a Coated Metal Alloy Substrate

The present disclosure also relates to a process for producing a coated metal alloy substrate disclosed herein. The process for producing a coated metal alloy is described below and shown in the flow chart in FIG. 1.

The metal alloy substrate is coated with a hydrophobic anti-fingerprint layer. The anti-fingerprint layer may be sprayed, rollered, dipped, or brushed onto the metal alloy surface.

The metal alloy substrate is engraved to form a chamfered edge. The chamfered edge formed by the engraving may be an exposed non-oxidized surface of the substrate. This process removes a part of the any coated surface, including, for example, any oxidized layers to expose a shiny surface of the underlying substrate. Part of the first coated surface of the substrate is retained after the engraving process.

Engraving the metal alloy substrate to form at least one chamfered edge may be carried out to form a predefined pattern or shape. The engraving process may allow the formation of patterns that will provide a surface of the chamfered edge with a texture or finish that is different to the texture or finish of the metal alloy substrate that has not been engraved.

Engraving the metal alloy substrate to form at least one chamfered edge may be carried out using a Computer Numeric Control (CNC) diamond cutter or a laser engraver. Using this process, parts of the metal alloy substrate may be cut away and the each resulting chamfered edge may form an edge, a sidewall, a logo, a gap for a click pad, a gap for a fingerprint scanner.

A passivation layer is then deposited at the at least one chamfered edge. The passivation layer may be sprayed, rollered, dipped, or brushed onto the metal alloy surface.

A water based paint layer is then deposited at least part of the passivation layer. The water based layer may be sprayed, rollered, dipped, ink-jet printed, or brushed onto the metal alloy surface.

Any excess paint around the chamfered edge may be removed. This is due to the water based layer adhering well to the passivation layer of the chamfered edge, but not adhering well to the hydrophobic anti-fingerprint layer. In this way, the two surfaces may be processed to result in a dual surface product with good aesthetic properties and a finish having a uniform appearance. In this way, protection may be provided to the areas that are most susceptible to damage.

The metal alloy substrate may be treated to form a first layered surface or a first treated surface as disclosed herein before applying the hydrophobic anti-fingerprint coating.

To form a first layered surface, the metal alloy substrate may be treated to form an oxidized layer. The oxidized layer may comprise an oxidized layer of the metallic substrate. The oxidized layer may comprise a micro-arc oxide layer, such as a micro-arc oxide layer of the metal alloy. The micro-arc oxide layer is prepared by micro-arc oxidation of the substrate.

Micro-arc oxidation (MAO) is an electrochemical oxidation process that can, for example, generate an oxidized layer on a metallic substrate, such as a substrate comprising a metal alloy. MAO involves creating micro-discharges on a surface of the metal alloy immersed in an electrolyte to produce a crystalline oxide coating. The resulting micro-arc oxide layer may be ductile and have a relatively high hardness. Unlike anodizing processes, MAO employs a high potential such that discharges occur.

The resulting plasma can modify the structure of the oxide layer. MAO is a chemical conversion process that causes oxidation of the underlying metal alloy material, instead of an oxide layer being disposed on to a surface of the metal alloy. This may lead to a metal surface with enhanced wear and corrosion resistance and may prolong the component lifetime. In comparison to an oxide layer produced by a deposition process, a micro-arc oxide layer may have a higher adhesion to the underlying metal alloy.

The electrolytic solution for MAO may comprise an electrolyte selected from sodium silicate, sodium phosphate, potassium fluoride, potassium hydroxide, sodium hydroxide, fluorozirconate, sodium hexametaphosphate, sodium fluoride aluminium oxide, silicon dioxide, ferric ammonium oxalate, a salt of phosphoric acid, polyethylene oxide alkylphenolic ether and a combination thereof.

When the oxidized layer comprises two layers, such as an inorganic layer and an oxidized layer of the metallic substrate, then each layer is prepared in a stepwise manner. Thus, for example, the oxidized layer of the metallic substrate, such as a micro-arc oxide layer, may be prepared before the inorganic layer.

One or more protective layers are then applied to the oxidized layer. Each of these layers may be sprayed, rollered, dipped, or brushed onto the metal alloy surface.

In one example, as shown in the flow chart of FIG. 2, the metal alloy substrate is treated with MAO to form a micro-arc oxide layer, or an inorganic layer is applied as a non-transparent passivation layer. A primer coat, base coat and top coat are then added in sequential layers before the addition of a hydrophobic anti-fingerprint coating. The metal alloy substrate is then engraved with CNC laser engraving to form a chamfered edge. The chamfered edge is then treated with a passivation layer and a water based paint layer. In this example, in a final step, the extra paint is removed from around the chamfered edge.

Figure 3:
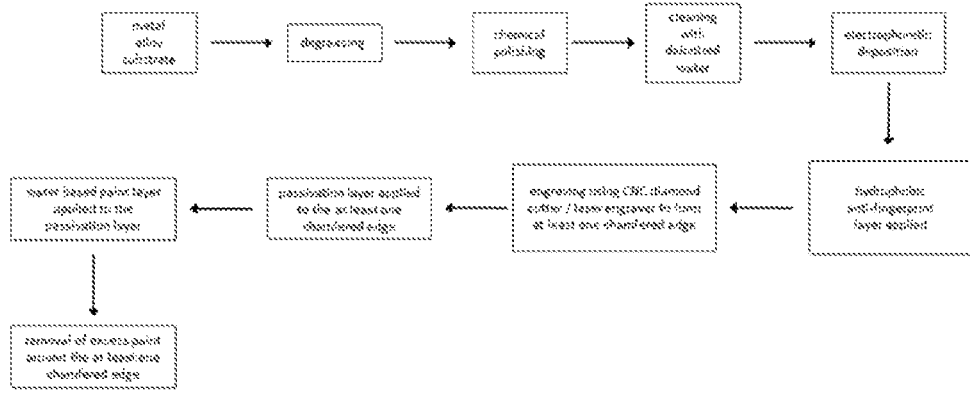
FIG. 3 is flow chart showing an example of a process for producing a coated metal alloy substrate comprising the formation of a first treated surface.

In a further example, as shown in the flow chart of FIG. 3, the metal alloy substrate is degreased, subjected to chemical polishing then cleaned with deionized water. Electrophoretic deposition is carried out to form an electrophoretic polymer layer.

To carry out the electrophoretic deposition, the metal alloy substrate is made an electrode of an electrochemical cell. The electrochemical cell also has an inert electrode as the counter electrode and an electrolyte comprising the electrophoretic polymer. A potential difference is applied across the electrodes of the electrochemical cell to deposit the electrophoretic polymer over the coating layer. The electrolyte may have a concentration of from about 1 wt. % to about 25 wt. %, such as from about 5 wt. % to about 20 wt. %, or from about 10 wt. % to about 15 wt. % of the electrophoretic polymer. The polymer, in general, has ionizable groups. When the polymer is a negatively charged material, then it will be deposited on the positively charged electrode (anode). When the polymer is a positively charged material, then it will be deposited on the negatively charged electrode (cathode).

A hydrophobic anti-fingerprint coating then deposited onto the electrophoretic polymer layer.

The metal alloy substrate is then engraved with CNC laser engraving to form a chamfered edge. The chamfered edge is then treated with a passivation layer and a water based paint layer. In this example, in a final step, the extra paint is removed from around the chamfered edge.

In one example, no further coating is applied after treating the chamfered edge with a passivation layer and a water based paint layer.

Each layer may be applied to achieve a desired thickness. The thickness of each layer can be measured after it has been applied using, far example, a micrometre screw gauge or scanning electron microscope (SEM).

Electronic Device

The electronic device of the present disclosure may be a computer, a laptop, a tablet, a workstation, a cell phone, a portable networking device, a portable gaming device and a portable GPS.

The electronic device has an electrical circuit, such as a motherboard or display circuitry. The housing may be external to the electrical circuit.

Housing

As described in the present disclosure, an electronic device may have a housing. The housing comprises a metal alloy substrate disclosed herein. The metal alloy substrate can be light-weight and may provide a durable housing. The housing of the present disclosure may have cosmetic features that are visually appealing to a user, such as an attractive surface finish and it may have a design features with a pleasant texture.

The housing may provide an exterior part of the electronic device, such as a cover or a casing of the electronic device. The housing may include a support structure for an electronic component of the electronic device. The housing may include a battery cover area, a battery door or a vent.

The housing may provide a substantial part of the cover or the casing of the electronic device. The term "substantial part" in this context refers to at least about 50%, such as at least about 60%, at least about 70%, at least about 80% or at least about 90%, of the total weight of the cover or the casing. The housing may provide the entire cover or casing of the electronic device.

The housing can be a cover, such as a lid, the casing or both the cover and the casing of the electronic device. The casing may form a bottom or lower part of the cover of the electronic device. In one example, the housing is the casing of a laptop, a tablet or a cell phone.

The housing may comprise a dual surface metal alloy substrate, wherein the chamfered edge may comprise different coating layers than the main non-engraved surface of the metal alloy substrate. The main non-engraved surface of the metal alloy substrate may provide a bezel for a display screen, a casing, or wrist rest for a keyboard.

The chamfered edge may provide an edge or peripheral area in the housing for a touchpad, a fingerprint scanner, a trackball, a pointing stick, or a button, such as a mouse button or a keyboard button.

Figure 4:
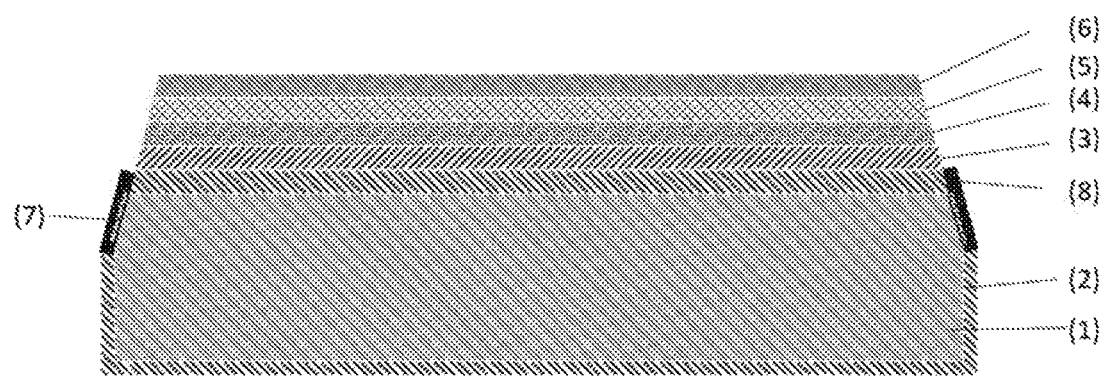
FIG. 4 is a partial cross-sectional diagram showing an example of a coated metal alloy substrate.

An example of a housing of the present disclosure is shown in FIG. 4, which is a partial cross section through the housing. The housing has a metal alloy substrate (1) with an oxidized layer (2), which may be a micro-arc oxide layer or an inorganic layer. A first protective layer (3) is deposited on the oxidized layer (2). The first protective layer (3) may, for example, be a primer coating layer. A second protective layer (4) is deposited on the first protective layer (3). The second protective coating layer (4) may be a base coating layer. A third protective layer (5) is deposited on the second protective layer (4). The third protective coating layer (5) may be a transparent top coating layer. A hydrophobic anti-finger print layer (6) is then deposited onto the third protective layer (5).

The oxidized layer (2), the first protective layer (3), the second protective layer (4), the third protective layer (5) and the hydrophobic anti-finger print layer (6) form a non-engraved coated surface of the metal alloy substrate.

On the chamfered edge of the substrate, a passivation layer (7) is deposited. The passivation layer (7) may be a transparent passivation layer. A water based painting layer (8) is then deposited on the passivation layer (7).

Figure 5:
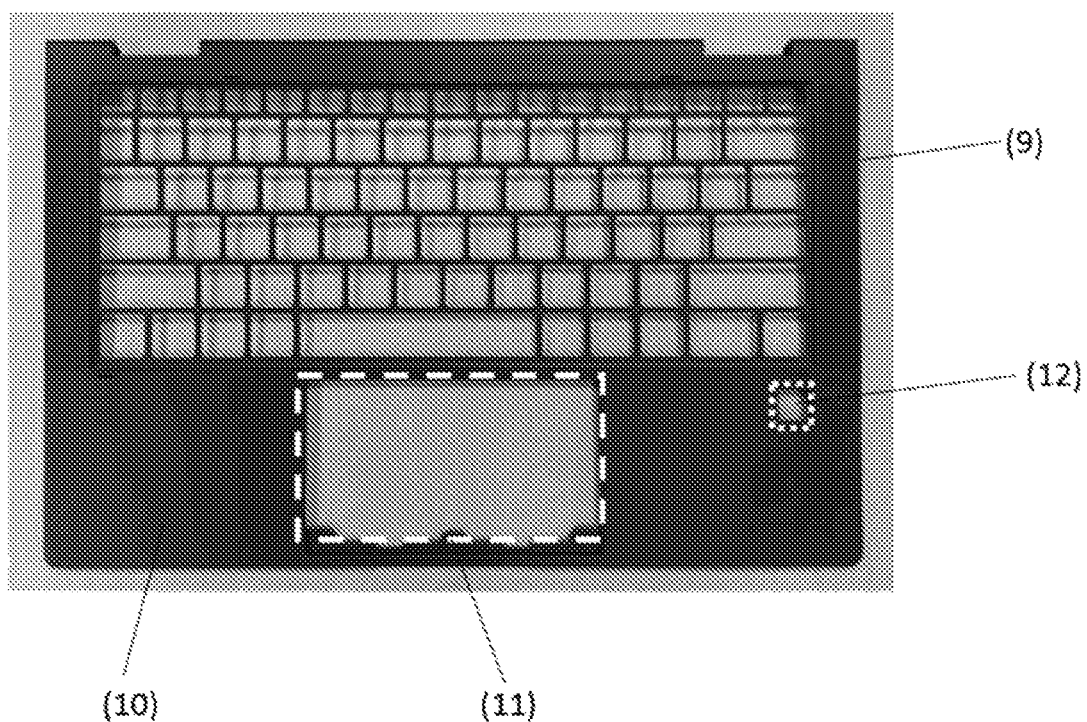
FIG. 5 shows an example housing for a laptop.

FIG. 5 shows an example of a housing of the present disclosure. The housing is a casing (9) for a keyboard of a laptop. The non-engraved coated surface of the metal alloy substrate (10) provides a wrist rest and cover for the laptop. Chamfered edges form further surfaces such as (11) and (12). One of these surfaces (11) was diamond cut from the main casing and forms an edge around a touchpad. The other surface (12) was also diamond cut from the main casing and provides an edge around a fingerprint scanner. Both surfaces have an attractive appearance and provide a pleasant tactile surface. Along with a high metallic lustre, the surfaces are corrosion resistant and have a durable coating. The surface also has an anti-smudge function.

EXAMPLES

The following illustrates examples of the methods and other aspects described herein. Thus, these Examples should not be considered as limitations of the present disclosure, but are merely in place to teach how to make examples of the present disclosure.

Example 1

A keyboard casing for a laptop was manufactured from a magnesium alloy substrate comprising the magnesium alloy AZ31B, which comprises, based on the weight of the total alloy: Al: 2.5-3.5 wt. %, Zn: 0.6-1.4 wt. %, Mn: 0.2 wt. %, Si: 0-1 wt. %, Cu: 0.05 wt. %, Ca: 0.04 wt. %, Fe: 0.005 wt. %, Ni: 0.005 wt. % and the remainder being Mg and inevitable impurities.

An oxidized surface layer was formed on the magnesium alloy substrate by micro-arc oxidation. The oxidized surface layer was then coated with a primer coating layer of polyurethane polyester. The primer coating layer of polyurethane polyester was then coated with a base coating layer of polyurethane. The base coating layer of polyurethane was then coated with a UV top coat of urethane acrylate. A hydrophobic anti-fingerprint coating layer comprising 20 wt. % polyvinylidenefluoride, 40 wt. % isophorone, 5 wt. % cyclohexanone, 35 wt. % paraloid B44 acrylic resin, based on the total weight of the hydrophobic anti-fingerprint coating layer was then applied to the UV top coat in a thickness of 750 nm. The combination of the micro-arc oxidation layer, the primer coating layer, the base coating layer and the UV top coating layer formed a non-engraved coated surface of the metal alloy substrate.

Chamfered edges were then cut into the coated metal alloy substrate by using a CNC cutting process to expose a nonoxidised surface of the coated metal alloy substrate. The CNC cutting process was used to cut openings in the casing for a touchpad and for a fingerprint scanner.

The shiny, exposed chamfered edges of the substrate were then coated with a solution comprising a chelated metal complex where the chelating agent is DTTPH and the metal ion is zinc. The solution was dried and formed a transparent passivation layer that protects the underlying metallic surface of the substrate and prevents it from undergoing atmospheric oxidation.

An acrylic water based paint layer comprising 60 wt. % acrylic resin, 37 wt. % de-ionized water, 0.7 wt. % alkyl phosphate silicone, 0.8 wt. % Skytech C055 and 1.5 wt. % Acrysol™ RM-725, based on the total weight of the acrylic water based paint layer was then sprayed onto the transparent passivation layer on the chamfered edges. Excess paint around the chamfered edges was then removed.

The attractive metallic lustre of the magnesium alloy substrate remained visible through layers applied. The magnesium alloy was found to exhibit corrosion resistance properties.

The invention claimed is:

1. A coated metal alloy substrate for an electronic device, wherein the coated metal alloy substrate comprises a metal alloy substrate and at least one chamfered edge and further comprises:
   a hydrophobic anti-fingerprint layer deposited on the metal alloy substrate;
   a passivation layer deposited on the at least one chamfered edge; and
   a water based paint layer deposited on the passivation layer, wherein portions of a lateral surface of the hydrophobic anti-fingerprint layer opposite from the metal alloy substrate are free of the passivation layer and the water based paint layer.

2. The coated metal alloy substrate according to claim 1, wherein the hydrophobic anti-fingerprint layer comprises a fluoropolymer selected from fluorinated olefin-based polymers, fluoroacrylates, fluorosilicone acrylates, fluorourethanes, perfluoropolyethers, perfluoropolyoxetanes, C1 to C6 fluorotelomers, polytetrafluoroethylene, polyvinylidenefluoride and fluorosiloxane.

3. The coated metal alloy substrate according to claim 1, wherein the passivation layer is a transparent passivation layer comprising a chelating agent and a metal ion or chelated metal complex thereof.

4. The coated metal alloy substrate according to claim 3, wherein the chelating agent is selected from ethylenediaminetetraacetic acid, ethylenediamine, nitrilotriacetic acid, diethylenetriaminepenta(methylenephosphonic acid), nitrilotris(methylenephosphonic acid), 1-hydroxyethane-1,1-diphosphonic acid and phosphoric acid, and the metal ion is selected from an aluminium ion, a nickel ion, a chromium ion, a tin ion, an indium ion, and a zinc ion.

5. The coated metal alloy substrate according to claim 1, wherein the water based paint layer comprises a resin selected from acrylic, epoxy resin, polyurethane, polyester, epoxy acrylate, and polyurethane acrylate.

6. The coated metal alloy substrate according to claim 1, wherein the water based paint layer comprises a pigment, wherein the pigment is selected from carbon black, titanium dioxide, clay, mica, talc, barium sulfate, calcium carbonate, synthetic pigment, pearl pigment, metallic powder, aluminium oxide, dye, graphite, and an inorganic powder.

7. The coated metal alloy substrate according to claim 1, wherein the metal ahoy substrate comprises a metal selected from aluminium, magnesium, lithium, titanium, niobium, zinc and alloys thereof.

8. The coated metal alloy substrate according to claim 1, wherein the metal alloy substrate is an insert moulded metal substrate comprising a plastic insert.

9. The coated metal alloy substrate according to claim 8, wherein the plastic is selected from polybutylene terephthalate, polyphenylene sulfide, polyamide, polyphthalamide, acrylonitrile butadiene styrene, polyetheretherketone, polycarbonate and acrylonitrile butadiene styrene with polycarbonate.

10. The coated metal alloy substrate according to claim 1, wherein the electronic device is selected from a computer, a laptop, a tablet, a workstation, a cell phone, a portable networking device, a portable gaming device and a portable GPS.

11. A process for producing the coated metal alloy substrate for an electronic device according to claim 1, the process comprising:
    applying the hydrophobic anti-fingerprint layer to the metal alloy substrate;
    engraving the metal alloy substrate to form the at least one chamfered edge;
    applying the passivation layer to the at least one chamfered edge; and
    applying the water based paint layer to the passivation layer.

12. The process according to claim 11, wherein engraving the metal alloy substrate is carried out using a CNC diamond cutter or a laser engraver.

13. The process according to claim 11, wherein the metal alloy substrate is treated with micro-arc oxidation or passivated before applying the hydrophobic anti-fingerprint layer.

14. The process according to claim 11, wherein the metal alloy substrate is treated with electrophoretic deposition before applying the hydrophobic anti-fingerprint layer.

15. An electronic device having a housing, wherein the housing comprises:
    a metal alloy substrate with at least one chamfered edge;
    a hydrophobic anti-fingerprint layer deposited on the metal alloy substrate;
    a passivation layer deposited on the at least one chamfered edge; and
    a water based paint layer deposited on the passivation layer, wherein portions of a lateral surface of the hydrophobic anti-fingerprint layer opposite from the metal alloy substrate are free of the passivation layer and the water based paint layer.

* * * * *